United States Patent [19]  
von Meltzing et al.

[11] Patent Number: 5,033,157  
[45] Date of Patent: Jul. 23, 1991

[54] WINDSHIELD WIPER ARRANGEMENT

[75] Inventors: Wolfgang von Meltzing, Bierbach, Fed. Rep. of Germany; Michel Gunther, Morsbach, France

[73] Assignee: Deere & Company, Moline, Ill.

[21] Appl. No.: 264,415

[22] Filed: Oct. 31, 1988

[30] Foreign Application Priority Data

Oct. 31, 1987 [DE] Fed. Rep. of Germany ....... 3737040

[51] Int. Cl.⁵ .............................................. B60S 1/40
[52] U.S. Cl. .............................. 15/250.21; 15/250.23; 15/250.33
[58] Field of Search ........... 15/250.21, 250.23, 250.31, 15/250.32, 250.33, 250.35

[56] References Cited

U.S. PATENT DOCUMENTS

| 1,571,516 | 2/1926 | Folberth et al. | 15/250.23 |
| 1,703,181 | 2/1929 | Tarver | 15/250.33 |
| 2,079,399 | 5/1937 | Drew et al. | 15/250.23 |
| 2,552,822 | 5/1951 | Smulski | 15/250.23 |
| 2,644,187 | 7/1953 | Lacy | 15/250.23 |
| 3,014,232 | 12/1961 | Krohm | 15/250.23 |
| 3,428,995 | 2/1969 | Pollock | 15/250.21 |
| 4,546,518 | 10/1985 | Harbison et al. | 15/250.23 |
| 4,736,486 | 4/1988 | Beneteau et al. | 15/250.23 |

FOREIGN PATENT DOCUMENTS

| 490892 | 3/1953 | Canada | 15/250.31 |
| 625469 | 2/1936 | Fed. Rep. of Germany | 15/250.23 |
| 1031660 | 11/1958 | Fed. Rep. of Germany | |
| 2233438 | 1/1974 | Fed. Rep. of Germany | |
| 2510416 | 9/1975 | Fed. Rep. of Germany | 15/250.23 |
| 3405677 | 8/1984 | Fed. Rep. of Germany | 15/250.21 |
| 2490565 | 3/1982 | France | |
| 82778 | 9/1956 | Netherlands | 15/250.23 |
| 244749 | 5/1947 | Switzerland | |
| 604483 | 7/1948 | United Kingdom | 15/250.23 |
| 2586218 | 2/1958 | United Kingdom | |
| 803324 | 10/1958 | United Kingdom | 15/250.32 |
| 934472 | 8/1963 | United Kingdom | 15/250.23 |

Primary Examiner—Philip R. Coe  
Assistant Examiner—Mark Spisich

[57] ABSTRACT

A windshield wiper arrangement for a curved windshield comprises a joint shaft to which the wiper blade is mounted, and a channel-shaped retainer in which the joint shaft is pivotally mounted. The axis of the joint shaft is parallel to the longitudinal axis of the wiper blade. A linkage is pivotally coupled to the retainer to drive the wiper blade across the curved surface of the windshield. In the first embodiment, the joint shaft and wiper blade are prevented from rotation by a universal joint that is coupled to a fixed bearing by a connecting link. An elastic control link maybe operatively positioned between the fixed bearing and the connecting link, or the connecting link itself maybe elastic. In the second embodiment a lever having a universal ball and socket joint prevents rotation of the joint shaft and wiper blade. In the second embodiment the ball and socket joint are coupled to the linkage by an extension that is guided for longitudinal movement either by the linkage or the ball and socket joint.

5 Claims, 5 Drawing Sheets

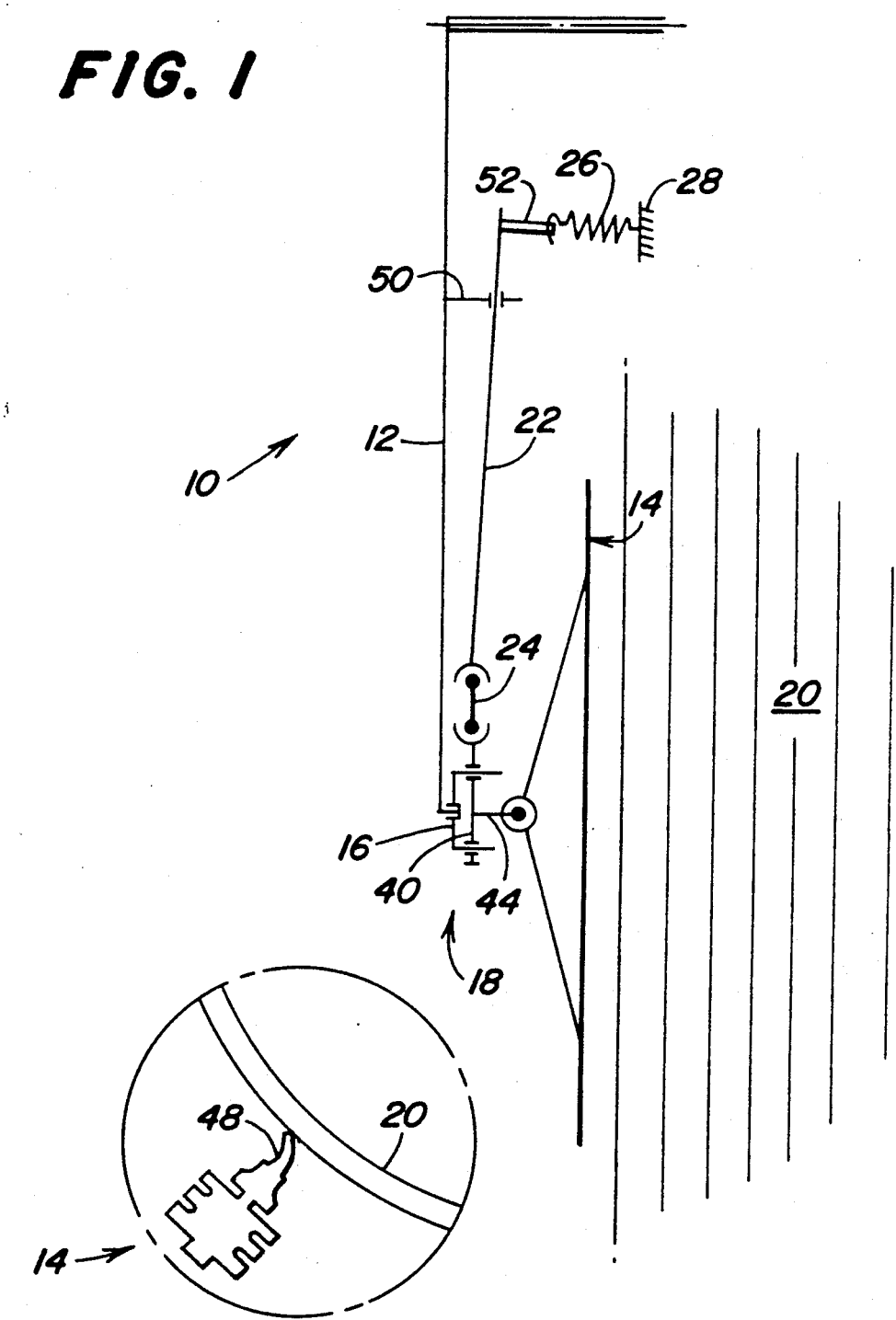

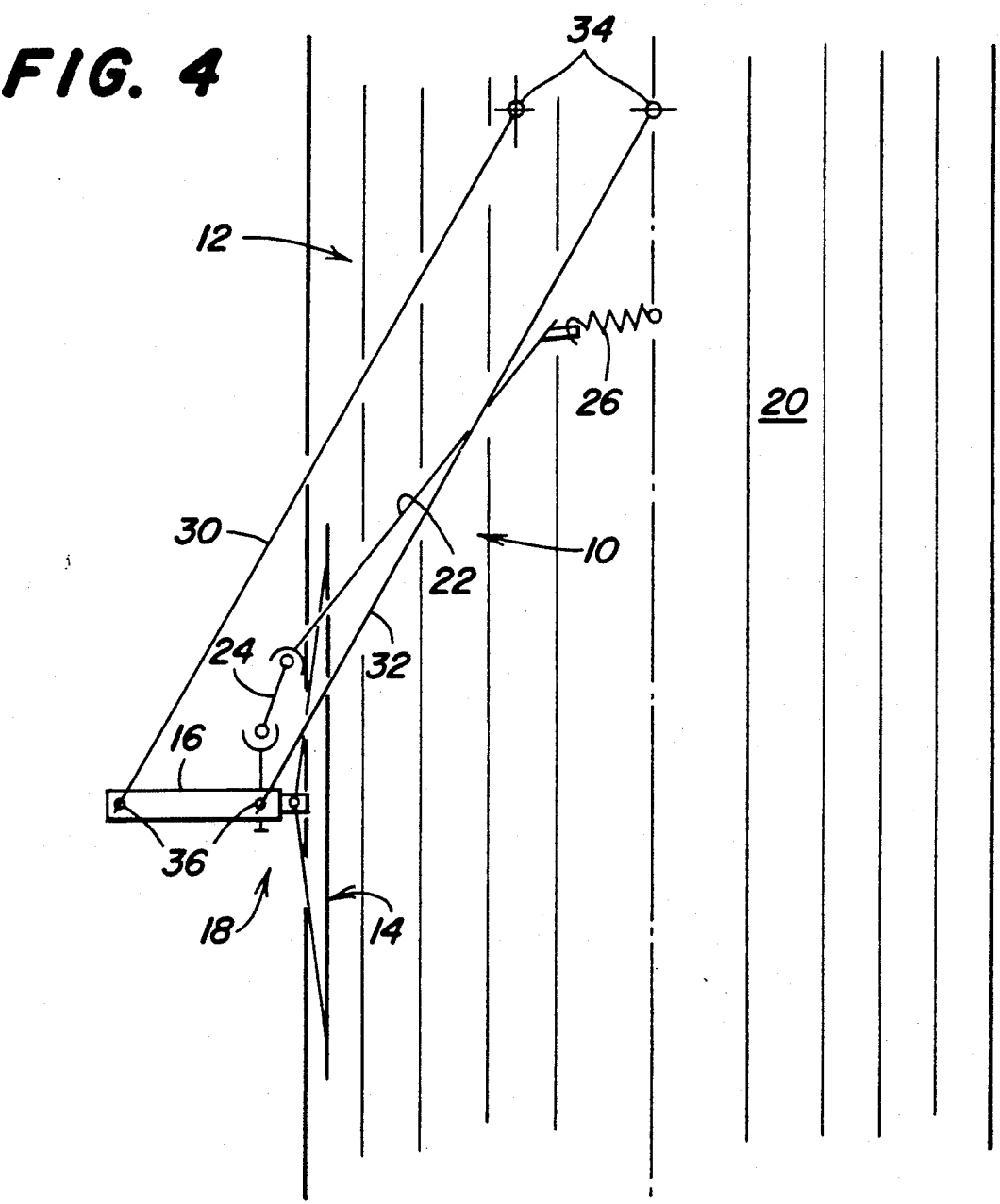
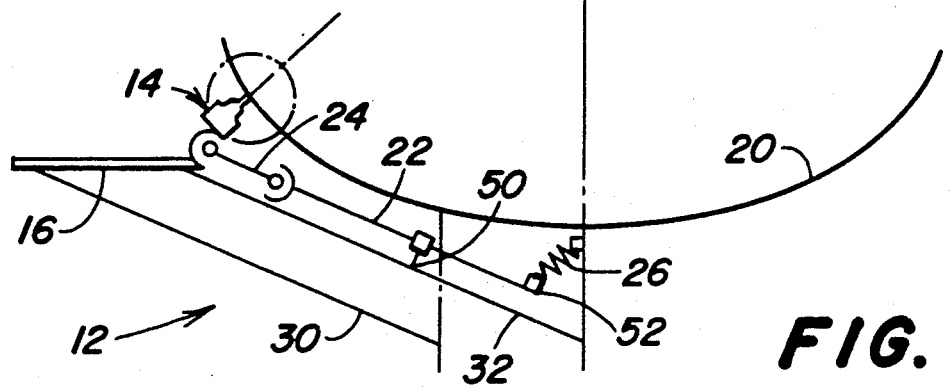

5,033,157

WINDSHIELD WIPER ARRANGEMENT

BACKGROUND OF THE INVENTION

1. Field of the Invention

The invention is directed to a windshield wiper arrangement with a wiper blade and a linkage, connected to each other by a retainer.

2. Description of the Prior Art

Such an arrangement is disclosed in DE-PS-1 031 660, where the wiper blade is maintained perpendicular to the surface to be cleaned. However, for adjustment, the wiper blade can be slid lengthwise on the wiper arm along a curved path. The lengthwise adjustment of the wiper blade requires a guide rod.

In this windshield wiper arrangement, the sliding connection may jam under conditions of corrosion and dirt.

DE-PS-2 233 438 discloses a windshield wiper arrangement in which the wiper blade can also be moved in a direction perpendicular to the longitudinal axis of the wiper arm. Such a movement is permitted by a ball joint, but it is not controlled.

Other windshield wiper arrangements (CH-PS-244 749) are widely known in the motor vehicle technology, and, in particular cases, include parallel guidance, that permits cleaning large surfaces, in particular, rectangular surfaces.

A disadvantage of the latter windshield wiper arrangement is seen in the fact that a good cleaning result can be obtained only when the surface to be cleaned is a planar or nearly planar surface. With curved windshields, the wiper blade is no longer radial or vertical to the surface beyond a certain wiper angle, and is then dragged over the surface without carrying away any water.

SUMMARY OF THE INVENTION

The problem underlying this invention is seen as that of developing a windshield wiper arrangement whose wiper blade is guided vertical to a curved windshield surface constantly for its entire length, and to achieve this with a high degree of reliability with a simple arrangement.

With this invention, the wiper blade is retained at the retainer, given parallel guidance by means of a joint, and rotated by its joint shaft, in order to eliminate frictional problems that could be expected in the prior art windshield wiper arrangements. The length of the windshield wiper assembly remains constant across the entire surface of operation, since the wiper blade does not move in its longitudinal direction.

Control of the inclination of the wiper blade with respect to the windshield can be accomplished by several means. One possibility provides for the suspension of the wiper blade from the retainer to control its inclination by means of a connecting linkage.

The connecting linkage is connected at one end to a fixed bearing and at the other end, it is either attached to the joint shaft, which in turn is fixed against rotation to the wiper blade, or directly to the wiper blade. A bracket or similar part is provided at the linkage, and a universal joint is provided between the connecting link and the joint shaft, for the retention and the freedom to move through a range of angles for this connecting linkage, which may consist of a connecting linkage. In order for the connecting link to follow the various positions of the wiper arm, it is appropriate that a control link, variable in length, extend between it and a fixed bearing, and which may be a helical spring, a shock cord or similar device. Similarly, the control link may be configured as a pure telescoping linkage or it may consist of two parts that can slide with respect to each other. If the control link is elastic, a positive side effect is obtained in that the wiper blade is returned from each of its end positions with reduced expenditure of force.

The inclination of the wiper blade can be varied by changing various dimensions, in particular the distances between the attaching points of the control link.

A further improvement in the cleaning of the surface to be wiped can be achieved if the wiper blade with its longitudinal axis is kept parallel by means of a linkage configured as a parallelogram, which means that it remains constantly parallel to the axis of curvature of the windshield.

Due to the parallel guidance of the wiper blade, which remains parallel to the longitudinal axis of curvature, no point contact, but only line contact takes place in traversing the curvature.

According to another possibility, the inclination of the wiper blade to the windshield is controlled by the relative position of the linkage to the retainer, in which case the linkage is configured as a parallelogram linkage. This has the advantage that relatively few parts are required. The point from which this relative position is taken must be fixed, depending upon whether the windshield curvature is convex or concave. In addition, it is possible to adjust the inclination of the wiper blade more or less strongly by changing the distance between the bearing center of the parallel linkage/retainer and the output point.

BRIEF DESCRIPTION OF THE DRAWINGS

FIG. 1 shows a schematic side view of a first embodiment of a windshield wiper arrangement of this invention.

FIG. 2 shows a plan view of the windshield wiper arrangement of FIG. 1 in connection with a curved windshield.

FIG. 3 shows an enlarged view of a portion of FIG. 2 in the area of the contact between the wiper blade and the windshield.

FIG. 4 shows a front view of the windshield wiper arrangement of FIGS. 1 and 2 at one end position

DETAILED DESCRIPTION OF THE PREFERRED EMBODIMENTS

Figures 5, 6:
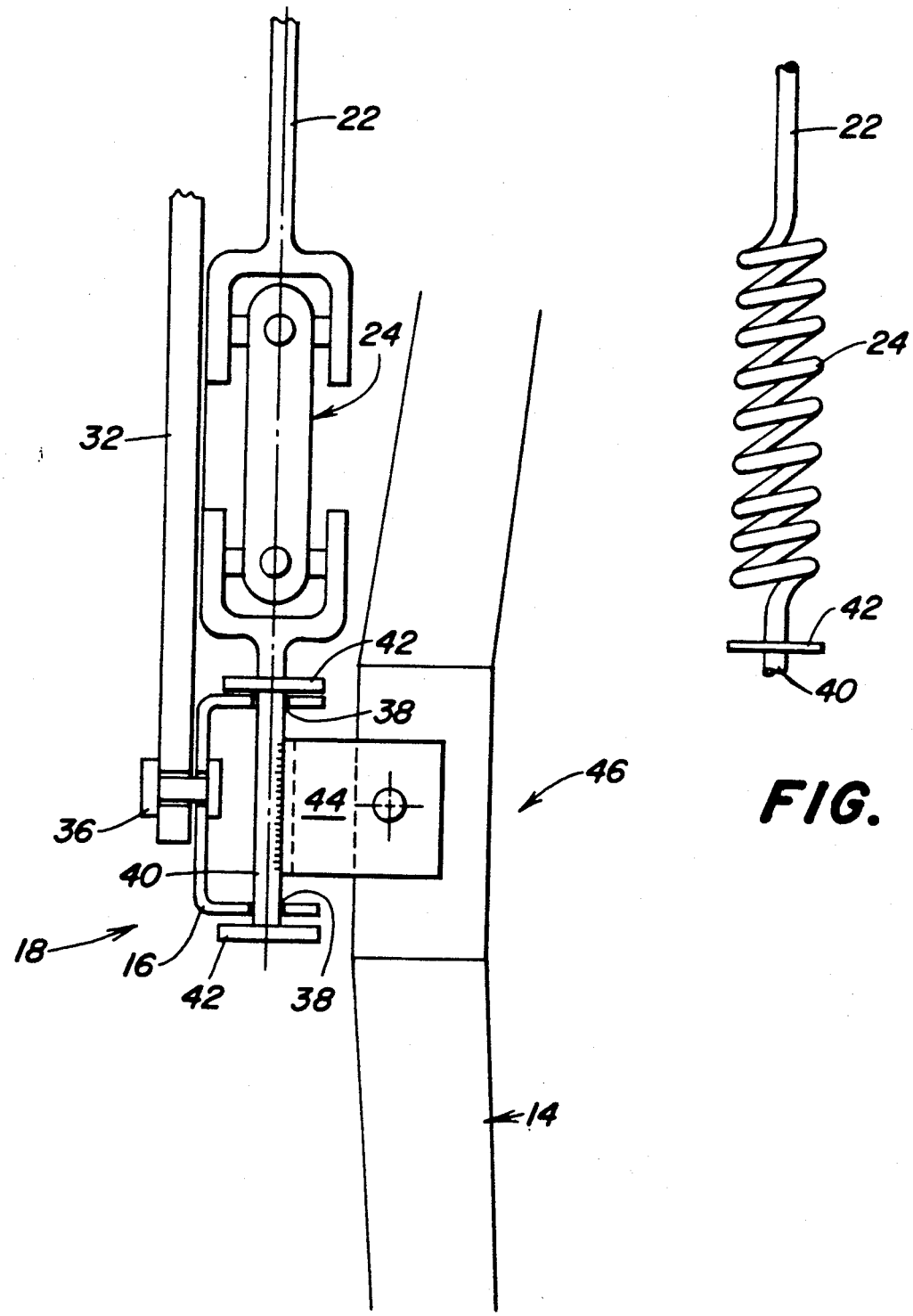
FIG. 5 shows an enlarged view of a part of the windshield wiper arrangement with a universal joint.
FIG. 6 shows the windshield wiper arrangement with a universal joint different from that of FIG. 5.

Windshield wiper arrangement 10, according to this invention, comprises linkage 12, wiper blade 14, retainer 16 and joint 18 and is intended for cleaning windshield 20 having a convex curvature. In a first embodiment for the control of the inclination of wiper blade 14 with respect to windshield 20, as shown in FIGS. 1-6, windshield wiper arrangement 10 generally also includes connecting link 22, universal joint 24 and control link 26, which engages fixed bearing 28.

Linkage 12 may be configured as a single wiper arm or as a parallelogram linkage. The only difference in operation is that the simple wiper arm does not move the wiper blade parallel to itself, but pivots it about a drive shaft. Both embodiments, however, originate with the idea of a parallelogram linkage, since this makes possible the cleaning of a large, and particularly a rectangular field. As illustrated in FIG. 2, linkage 12 comprises two steering arms 30 and 32, which are suspended at their upper end regions from bearing centers 34. At least one of the bearings centered is driven by a windshield wiper motor. Although the windshield wiper motor is not shown, the windshield wiper motor shaft is indicated in FIG. 1. At their lower end regions, steering arms 30, 32 engage retainer 16 at bearing centers 36. Once the distances between lower and upper bearing centers 34 and 36 have been established as equal, it is evident that this is a parallelogram linkage which constrains retainer 16 as well as wiper blade 14 to movement parallel to itself.

Retainer 16 is a U-shaped channel as seen from the side, which is open towards wiper blade 14. FIG. 5, in particular, shows that steering arm 32 is pivoted from retainer 16 by a rivet or a screw, which forms lower bearing center 36. The connection between retainer 16 and linkage 12 is arranged in such a way that these parts can perform a limited vertical pivoting motion, that is, in the horizontal plane as seen in FIG. 1.

Joint 18 protrudes from retainer 16 and forms a flexible connection between steering arm 32 and wiper blade 14. In the longitudinal direction of wiper blade 14, retainer 16 contains two holes 38 in the vicinity of steering arm 32 through which joint shaft 40 passes. Joint shaft 40 is equipped, in its end regions, with stops 42 that limit its axial motion. Between stops 42 and within the "U" of the channel, strap 44 is attached to joint shaft 40, preferably with screws. Strap 44 extends to web 46 in wiper blade 14 and retains it as a pivot. If strap 44 is welded to joint shaft 40, then it would be advantageous to open one of the holes 38 radially, so that joint shaft 40 can easily engage joint 18. Accordingly, wiper blade 14 can pivot with respect to strap 44, that is, in the horizontal plane, as seen in FIGS. 1 and 5. Together with strap 44 and joint shaft 40, wiper blade 14 can pivot about the joint shaft axis through holes 38. Together with strap 44, joint shaft 40 and retainer 16, wiper blade 14 can move with respect to steering arm 32 in a plane perpendicular to the horizontal plane of FIG. 5.

As illustrated in FIG. 2, windshield 20 has a nearly constant radius of curvature and extends over nearly 180 degrees of angle. Such windshields are used, for example, in one-man cabs and operator's cabs of combines, choppers, tractors, soil moving equipment and similar applications, because good visibility in all directions is required. The curvature of windshield 20 occurs about an axis of curvature, not shown, and as can be seen, in particular in FIG. 3, the wiper blade 14 with its wiper lip 48 is maintained generally radial to this curvature.

Connecting link 22 is a simple rod of plastic or steel, whose lower end engages universal joint 24, and is pivoted in its upper end region from bracket 50, attached to steering arm 32, and from whose upper end region tongue 52 extends radially towards windshield 20 or fixed bearing 28.

Universal joint 24 is so configured that it permits various angles between joint shaft 40, which is maintained perpendicular to the longitudinal axis of retainer 16, and connecting link 22, whose position relative to joint shaft 40 changes with the wiper angle of windshield wiper arrangement 10 and hence of its linkage 12. For this purpose, an appropriate configuration of universal joint 24 includes a Hooke's joint, a constant-velocity universal joint, (see FIG. 5), a torsionally stiff spring (see FIG. 6), or a beam spring integrated into connecting link 22. The connection between joint shaft 40 and connecting link 22 retains connecting link 22 with respect to its longitudinal axis, where, however, it can move up and down in bracket 50 to a limited extent depending on the wiper angle. It is not significant to the spirit of the invention, how universal joint 24 is connected to connecting link 22 and joint shaft 40; a detachable connection is advantageous in any case, although not shown in the drawing, for sake of simplicity. It is also possible to retain universal joint 24 to connecting link 22 and/or the joint shaft 40 with some axial clearance and to attach connecting link 22 to bracket 50 with no axial clearance.

In this embodiment, control link 26 is configured as an elastic member, which is not mandatory. It is sufficient that it is adjustable in length, which can be achieved by a telescopic connection or by two components that can slide relative to each other. This adjustable length permits connecting link 22 to move away from fixed bearing 28 to a greater or lesser degree during the traverse of the area wiped, but without sacrificing its primary function, that of sensing the rotation of connecting link 22 with respect to the wiper angle. The use of elastic control link 26 has a further advantage that will be discussed in detail below.

The elasticity of control link 26 is obtained from its configuration as a conventional helical steel spring. Link 26 is hooked onto fixed bearing 28 at one end and hooked onto tongue 52 at the other end. In place of the helical steel spring, a shock cord or similar device could be used. Regardless of the use of elastic control link 26, linkage 12 obviously contains a spring, which is not shown, as in any conventional windshield wiper arrangement, used to force wiper blade 14 against windshield 20. In any case, control link 26 is at all times under varying tension, where the tension is least when windshield wiper arrangement 10 is in its center position. The further linkage 12 and wiper blade 14 move towards one of their end positions, the more control link 26 is stretched, as can easily be seen in FIGS. 1 and 4, so that the pressure of wiper blade 14 on windshield 20 is reduced. This feature has the unexpected and advantageous side effect of the windshield wiper motor not being loaded excessively during the reversal of motion of linkage 12 and wiper blade 14 towards the central position.

Fixed bearing 28 is an attachment point on the frame of windshield 20 or on windshield 20 itself. Fixed bearing 28 exhibits a predetermined, but nevertheless adjustable distance to the indicated windshield wiper motor shaft.

The foregoing results in the following operation of the first embodiment for the control of wiper blade 14 of windshield wiper arrangement 10 of this invention.

The following description starts with the windshield wiper arrangement in its central position, that is, midway between its two end positions. In this central position, bearing centers 34 and 36 form a rectangle, steering arms 30 and 32 as well as connecting link 22 extend parallel to the axis of curvature of windshield 20, universal joint 24 is centralized and not deflected in any direction, and control link 26 is at the condition of its minimum tension and extends in a direction radial to the axis of curvature of windshield 20.

Beginning in this central position, linkage 12 swings clockwise towards the reversal position shown in FIG. 4, so that the distance between joint shaft 40 and fixed bearing 28 increases. This change in length is compensated for within control link 26, which maintains a linear alignment with tongue 52, due to its internal tension, and changes its length accordingly. Since tongue 52 is rigidly attached to connecting link 22, it in turn pivots about its longitudinal axis. The sideways movement of linkage 12 with respect to the central position also leads to a change in the angle of connecting link 22 to retainer 16 and joint shaft 40 which is absorbed by universal joint 24. The pivoting motion of connecting link 22 is transmitted by universal joint 24 to joint shaft 40, which is rigidly connected to strap 44, and therefore, swings wiper blade 14 about the longitudinal axis of joint shaft 40. The amount of this swing is so proportioned that wiper blade 14 with its wiper lip 48 is vertical to windshield 20 and remains radial to the axis of curvature. Due to the change in the distance between fixed bearing 28 and the windshield wiper motor shaft, which is the center of rotation of windshield wiper arrangement 10. The aforementioned dimension can be varied, that is, the angle between wiper blade 14 and the surface of windshield 20. If linkage 12 is configured as a simple wiper arm without parallel guidance, then retainer 16 would pivot about bearing center 36, located at the right in FIG. 4, and orient itself towards connecting link 22; rotation of connecting link 22 would still take place due to the radial attachment of control link 26 and tongue 52 to connecting link 22.

Figure 7:
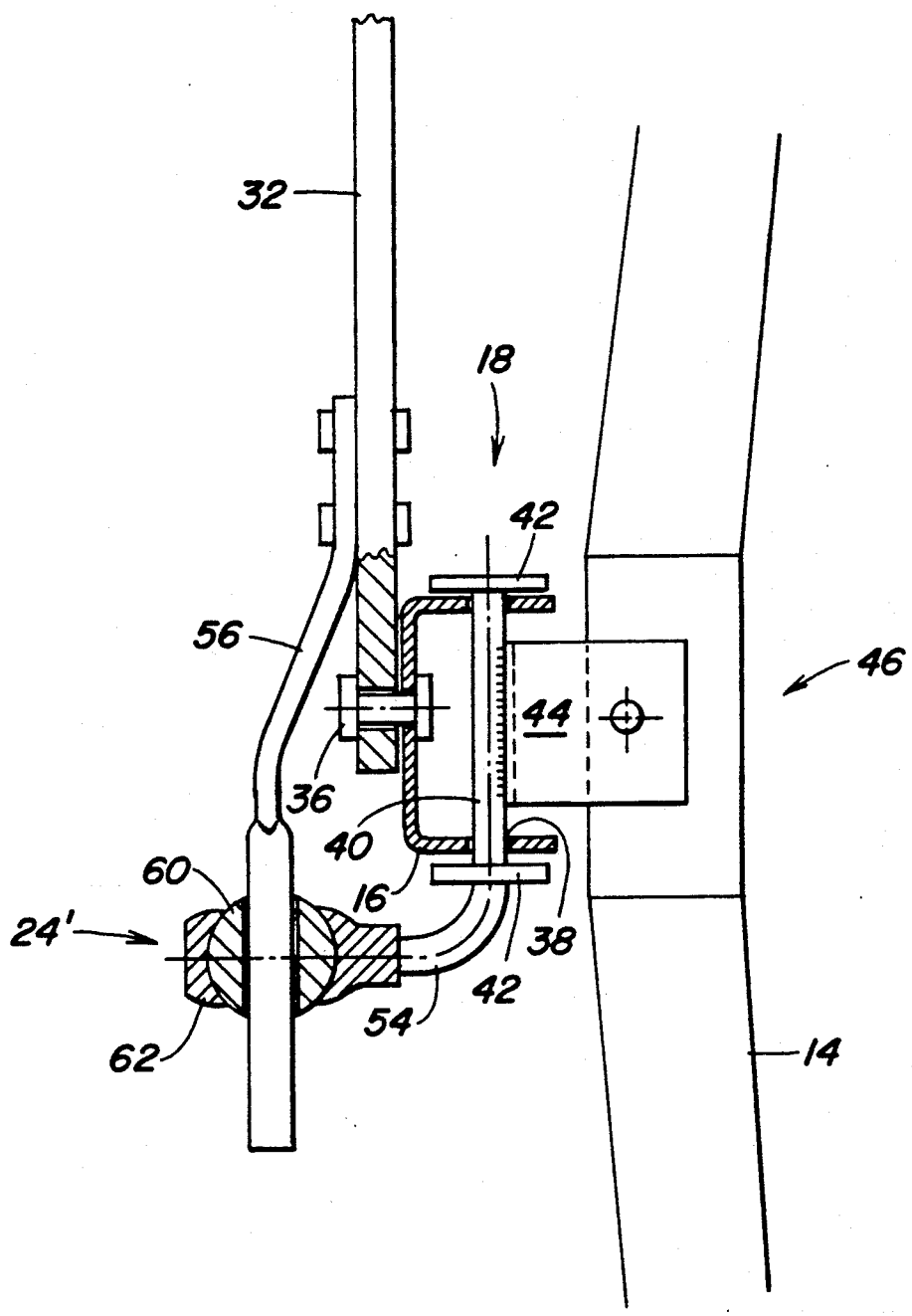
FIG. 7 shows a second embodiment of the windshield wiper arrangement of the invention with a swivel connection between a linkage and the wiper blade.
Figure 8:
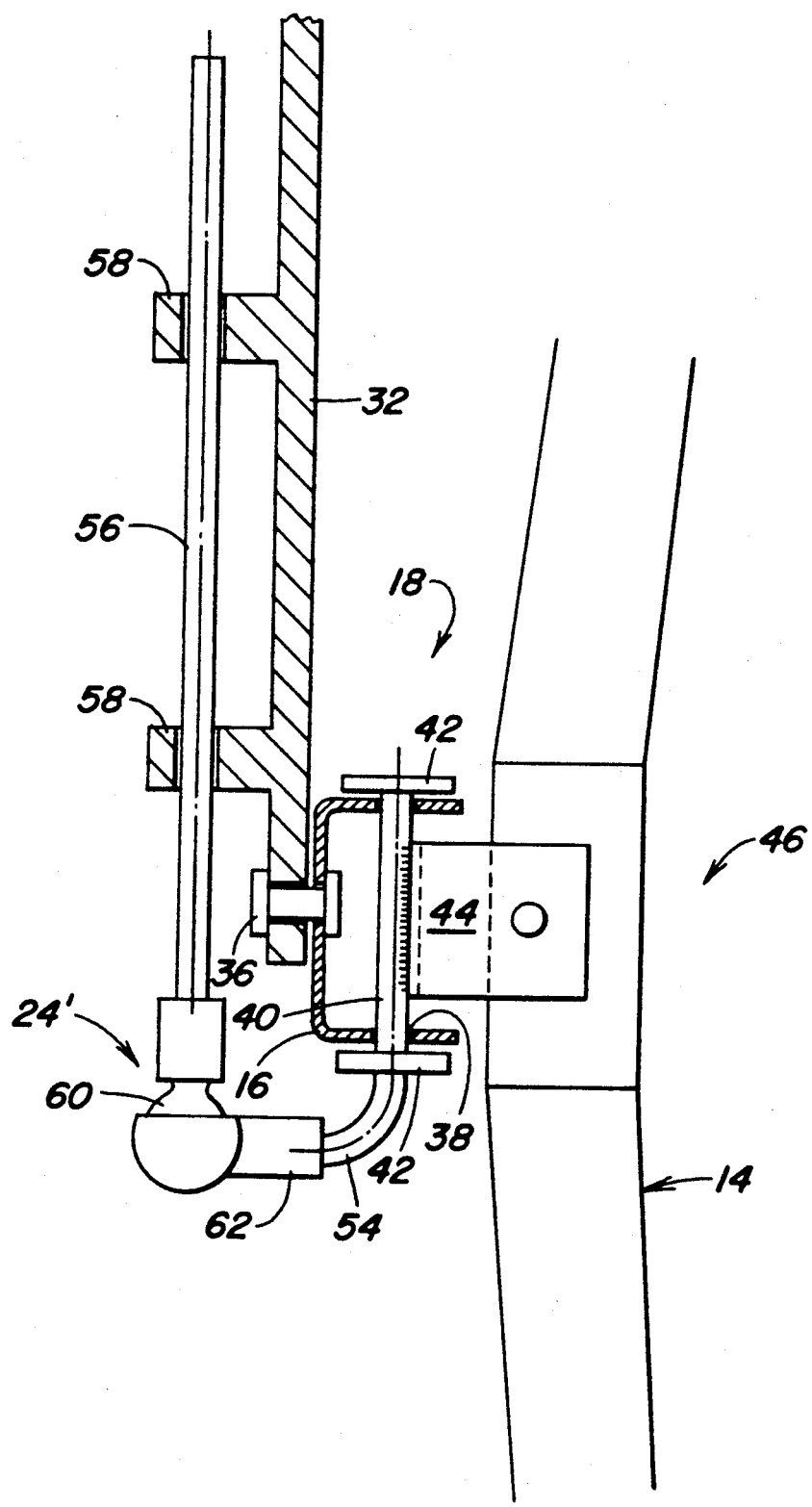
FIG. 8 shows the windshield wiper arrangement of FIG. 7 with a different swivel connection.

In a second embodiment for the control of the inclination of wiper blade 14 with respect to windshield 20, as illustrated in FIGS. 7 and 8, windshield wiper arrangement 10 includes lever 54 and extension 56 for one of the steering arms 30, 32 in this embodiment steering arm 32, and where, at the end of lever 54 another universal joint 24' is provided. This second embodiment is also based on linkage 12 providing parallel guidance.

In this embodiment, connecting link 22, previous universal joint 24, control link 26, fixed bearing 28, bracket 50 and tongue 52 are omitted.

Strap 54 forms a lever which is attached to the lower end of joint shaft 40. Lever 54 can be fixed to joint shaft 40 by welding; otherwise, joint shaft 40 is not altered. If necessary, lever 54 could be considered as an extension of joint shaft 40. Lever 54 extends radially from joint shaft 40 beyond steering arm 32.

Extension 56 of steering arm 32 may consist of a rod rigidly attached to the lower end region of steering arm 32, extending in the direction of the longitudinal axis of steering arm 32 beyond lever 54. There are various possibilities for the design of extension 56, for example, as shown in FIG. 7, a rod is riveted to the end region of steering arm 32 and is given two bends in opposite directions away from wiper blade 14. The embodiment according to FIG. 8 includes a rod that is carried in two guides 58 attached to steering arm 32 and is free to rotate. According to a third embodiment, which is not shown, steering arm 32 is longer than steering arm 30, and thus forms in itself extension 56. All embodiments have in common the fact that extension 56 extends at least to lever 54 and can move axially with respect to linkage 12 and hence steering arm 32 or with respect to lever 54.

In this embodiment, universal joint 24' is preferably configured as a ball joint, consisting of ball 60 and ball socket 62, in order to avoid friction losses. Here, ball 60 engages extension 56, while ball socket 62 is retained by lever 54. In the embodiment according to FIG. 7, extension 56 is slidably retained in ball 60 and is free to move axially within the ball. On the other hand, in the embodiment of FIG. 8, extension 56 is retained in ball 60 and hence in ball socket 62; it may, however, move in guides 58.

In connection with FIG. 4, it will be noted that every change in the relative position of steering arm 32 with extension 56 to retainer 16 and hence to joint shaft 40 causes a rotation of joint shaft 40 and with it wiper blade 14, due to the control of extension 56 by lever 54. The amount of the rotation depends on the length of extension 56 and the distance between ball socket 62 and joint shaft 40, and hence may also be varied.

When windshield 20 has a concave curvature, then lever 54 is located above retainer 16, and is connected to steering arm 32 as a pivot, for example, in the shape of a fork that straddled steering arm 32 from the side. The previous extension 56 is then omitted and would exist only as a "negative" extension from bearing center 36 upward. For windshield 20 of convex curvature, it is possible to proceed in the same way, which would result in a more compact windshield wiper arrangement 10. In that case, however, a reversing link, not shown, would have to be provided above bearing center 36, between steering arm 32 and lever 54, which would effect an inclination of wiper blade 14 in the opposite direction. Such a reversing link could be configured as an axle mounted vertically on retainer 16 and consisting of a rotating part with two arms, one of whose arms would engage steering arm 32 directly, while the other arm would engage lever 54, now located above joint shaft 40.

In the last named embodiment which is not illustrated, universal joint 24' is formed by a fork that straddles steering arm 32.

We claim:

1. A windshield wiper arrangement for curved surfaces, the arrangement comprising:
    a retainer;
    a joint shaft pivotally coupled to the retainer about an axis;
    a wiper blade having a longitudinal axis is coupled to the joint shaft so that the longitudinal axis of the wiper blade is parallel to the axis of the joint shaft;
    a linkage for driving the wiper blade across a surface to be wiped, the linkage comprising at least one steering arm and an extension mounted on the steering arm, the steering arm being pivotally coupled to the retainer; and
    a universal joint having a lever that is attached to the joint shaft, the extension of the steering arm is slidably received in the universal joint so that the lever is positively locked to the linkage, the extension is free to move axially in the universal joint;
    whereby the wiper blade can be pivoted under constraint about the joint shaft in a plane radial to the surfacer to be wiped.

2. A windshield wiper arrangement as defined by claim 1 wherein the linkage is a parallelogram linkage having two steering arms.

3. A windshield wiper arrangement as defined by claim 1 wherein the universal joint is a ball joint.

4. A windshield wiper arrangement as defined by claim 3, wherein the ball joint comprises a ball socket that is secured to the lever and a ball is positioned in the ball joint and slidably receives the extension.

5. A windshield wiper arrangement as defined by claim 4 wherein the linkage is a parallelogram linkage having two steering arms.

* * * * *